July 30, 1940.  K. H. HOOVER  2,209,920
APPARATUS FOR PREVENTING CORROSION
Filed Nov. 18, 1937   2 Sheets-Sheet 1
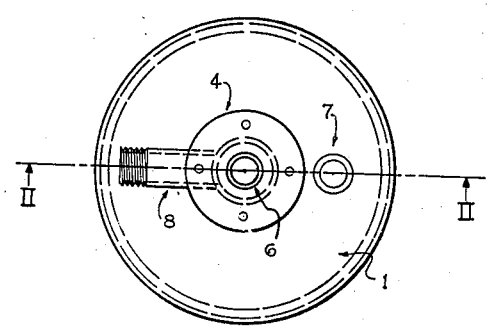
Fig. I.
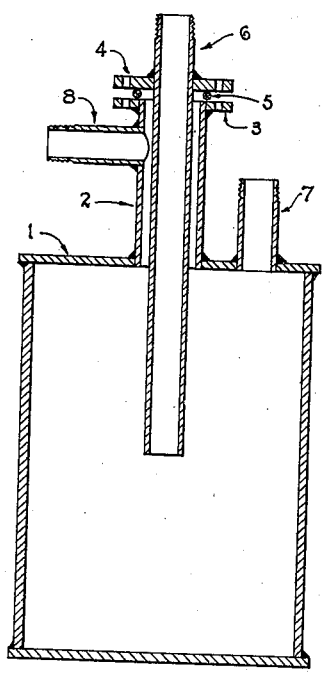
Fig. II.
Inventor:
Kenneth H. Hoover
By Francis M. Crawford
Attorney.

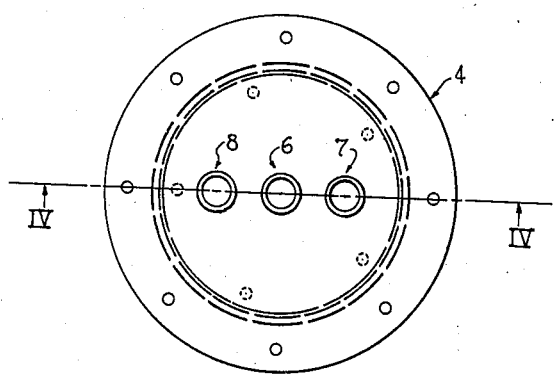
Fig. III.
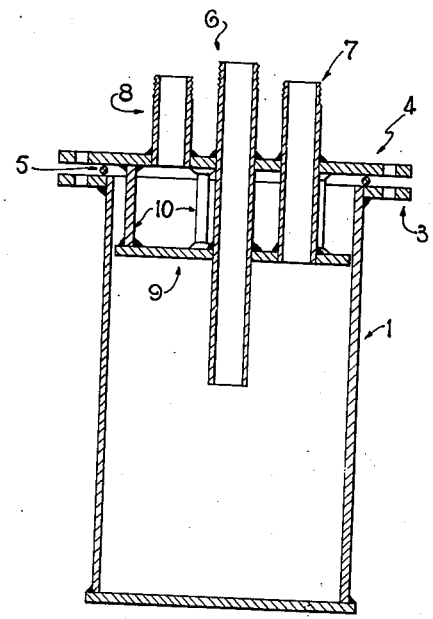
Fig. IV.

Patented July 30, 1940

2,209,920

UNITED STATES PATENT OFFICE 2,209,920

APPARATUS FOR PREVENTING CORROSION

Kenneth H. Hoover, Terre Haute, Ind., assignor to Commercial Solvents Corporation, Terre Haute, Ind., a corporation of Maryland Application November 18, 1937, Serial No. 175,259

2 Claims. (Cl. 23—285)

My invention relates to the prevention of corrosion in apparatus designed to contain corrosive vapors.

Vessels adapted to contain corrosive vapors may be constructed of various corrosion resistant materials, such as special alloys, refractory materials, and the like. However, all such materials are extremely hard or brittle, and a softer material is needed for the gaskets utilized for flanged joints or closures in such apparatus. The softer substances utilizable for gaskets, however, are not as resistant to corrosion as the harder constructional materials, and when in contact with certain vapors, such as nitric acid vapors, practically all suitable gasket materials, other than the precious metals, are subject to very severe corrosion.

An object of my invention, therefore, is to provide a method for preventing corrosion of gaskets and other corrodible parts of vessels adapted to contain corrosive vapors. A further object of my invention is to provide a suitable structure for such vessels to attain this end. Other objects and advantages of my invention will be apparent from the following description.

In accordance with my invention corrosion is prevented by substantially isolating the gaskets, or other corrodible parts, from the corrosive vapors by an atmosphere of non-corrosive gas. For this purpose the non-corrosive gas is introduced into the vessel, preferably at a point adjacent the part to be protected, and is continuously maintained in contact with said part, thus effectively isolating it from the corrosive vapors. It will be apparent that the non-corrosive gas must be continuously introduced to effect this end, but by minimizing diffusion between the corrosive vapors and the non-corrosive gas the latter may be introduced at a relatively low rate which will not interfere with the normal operation of the apparatus. The continuous introduction of the non-corrosive gas will, of course, dilute the corrosive vapors, and my invention is not applicable in cases where such dilution is undesirable. However, in most instances the dilution thus effected is not harmful or may, in fact, be beneficial. In the case of distillations, subsequent condensation of the corrosive vapors will effect the necessary separation and the non-condensed gas may then be recycled into the apparatus. If the corrosive vapors are to be employed in vapor phase reactions, a suitable non-corrosive gas may be chosen which will be inert in the reaction, and which may serve to effect proper thermal control of the reaction. Similarly, if the vapor phase reaction involves the use of a non-corrosive gas as another reactant, this gas may be utilized for protective purposes, in this manner also bringing about admixture of the reactants for the process. It is thus apparent that my invention has numerous applications and can readily be adapted for various uses in conjunction with the primary purpose of protection from corrosion.

An important feature of my invention constitutes the modified vessel structure adapted to effect protection from corrosion by means of non-corrosive gases. For this purpose the vessel is provided with means for introducing the non-corrosive gas and means for maintaining said gas in contact with the part to be protected. The vessel is thus equipped with an entrance port for the non-corrosive gas, which is preferably positioned at a point adjacent the part to be protected. The vessel structure is also modified to insure contact of only the non-corrosive gas with the said part, and this may be effected by providing a secondary chamber adjacent said part, communicating with the main chamber of the vessel, but adapted to prevent rapid diffusion of the corrosive vapors into the secondary chamber. For this purpose the secondary or protective chamber may be of elongated narrow construction, or baffles may be employed to minimize diffusion into a protective chamber of any type. In the preferred form, the structure is adapted to permit the maintenance of a slight pressure differential between the protective gas in the secondary chamber and the vapors in the main chamber. Other equivalent means may, of course, also be employed to prevent diffusion of the corrosive vapors into the protective chamber.

My invention is generally applicable to any vessels having corrodible parts and adapted to contain corrosive vapors, but is particularly adapted to vessels having removable closures equipped with corrodible gaskets, and especially to such apparatus designed to contain nitric acid vapors. Nitric acid vaporizers are required to supply nitric acid vapor for vapor phase reactions, and the construction of such vaporizers has previously presented a serious problem from the standpoint of gasket corrosion. Practically the only gasket materials available for such purposes in the past have been the precious metals which, of course, are in many cases prohibitive from the cost standpoint. In accordance with the present invention, however, any of the common gasket materials may be utilized in the construction of nitric acid vaporizers, and my invention will be specifically illustrated with respect to such apparatus.

In the drawings two forms of nitric acid vaporizers are illustrated, one modification being shown in plan in Fig. I and in sectional elevation in Fig. II. The second modification is shown in plan in Fig. III and in sectional elevation in Fig. IV.

Referring to the drawings, the vaporizer of Figs. I and II constitutes a vessel 1 fabricated from stainless steel, or other corrosion resistant metal such as tantalum or high silicon iron. If the constructional material is easily welded, the vessel may suitably be of all welded construction, with the exception of removable closures, as shown in the drawings. The vaporizer may be equipped with suitable heating means (not shown in the drawings) such as a steam jacket or means for direct firing. A removable closure for the vessel 1 is provided in the form of a flanged cover fitted to an elongated chamber 2 communicating with the main chamber of the vessel. The chamber 2 may suitably comprise a section of pipe of the same metal as the vessel structure, which may be welded to the vessel wall as shown in the drawings. The outer opening of the chamber 2 is equipped wtih a flange 3 and a corresponding closure flange 4 fitted in the usual manner with an interposed gasket 5. The flange 4 may suitably carry a pipe 6 for the introduction of liquid nitric acid into the vaporizer, and this pipe may be welded centrally into the flange as shown in the drawings. The vessel is also fitted with an outlet port 7 which may constitute a section of pipe welded to the vessel wall and communicating with the main chamber of the vessel. An entrance port 8 for the non-corrosive gas is provided in the secondary or gasket chamber 2 at a point adjacent the flanged closure, and may suitably constitute a section of pipe welded to the wall of the chamber 2 and communicating with the interior of said chamber.

In the operation of this device liquid nitric acid is introduced through the pipe 6 and heat is supplied to the vessel 1 to vaporize the acid at a rate corresponding to the rate of introduction of the liquid acid. A non-corrosive gas such as nitrogen or carbon dioxide is introduced through the pipe 8 at a rate sufficient to prevent diffusion of nitric acid vapor into the chamber 2, and the resulting mixture of nitric acid vapor and non-corrosive gas leaves the apparatus through the exit port 7. By suitably proportioning the gasket chamber 2 diffusion of nitric acid vapor into this chamber sufficiently far to endanger the gasket may be inhibited to such a point that an extremely slow rate of introduction of the non-corrosive gas will be sufficient to effectively isolate the gasket from the nitric acid vapor. Preliminary experiments with any given apparatus will quickly demonstate the minimum rate of introduction of the non-corrosive gas necessary for complete protection.

In the modification illustrated in Figs. III and IV the entire end of the vessel 1 is open and is fitted with a removable flange type closure. In this construction the vessel 1 may be fitted with a flange 3 welded to the vessel flush with the end of the side walls at the open end, as shown in the drawings, together with the corresponding closure flange 4 and the usual interposed gasket 5. The flange 4 carries a baffle plate 9 adapted to fit closely within the side walls of the vessel 1, and spaced from the flange 4 by means of supporting rods 10, to define a chamber adjacent the gasket 5. The closure flange 4 carries a pipe 6 for the introduction of liquid nitric acid into the vaporizer, this pipe preferably being welded both to the flange 4 and the baffle plate 9 as shown in the drawings. A similar pipe 7 which may also be welded both to the flange 4 and the baffle plate 9 serves as the exit port. The pipes 6 and 7 both extend through the baffle plate 9 and communicate with the main chamber of the vessel 1, the entrance pipe 6 preferably extending some distance below the baffle plate to reduce the tendency for liquid nitric acid to be mechanically carried out of the apparatus with the vapors. The entrance port 8 for the non-corrosive gas may constitute a section of pipe welded to the flange 4 as shown in the drawings, and communicating with the interior of the gasket chamber defined by the flange 4 and the baffle plate 9.

The operation of this vaporizer is exactly the same as that described with reference to the vaporizer shown in Figs. I and II. Liquid nitric acid is introduced through the pipe 6, and the non-corrosive gas is introduced through the pipe 8 at a rate sufficient to prevent the diffusion of nitric acid vapors into the chamber defined by the flange 4 and the baffle plate 9. The resulting mixture of nitric acid vapor and non-corrosive gas leaves the apparatus through the exit port 7. By minimizing the clearance between the baffle plate 9 and the walls of the vessel 1 diffusion of nitric acid vapor into the gasket chamber may be inhibited to such a point that an extremely small amount of non-corrosive gas continuously introduced will insure isolation of the gasket from the nitric acid vapor. As in the case of the modification previously described, preliminary experiments will readily determine the minimum rate of introduction for the non-corrosive gas to insure adequate protection of the gasket in an apparatus of this type.

Although my invention has been illustrated with reference to the protection of gaskets, it will be apparent to those skilled in the art that other corrodible parts in apparatus designed to contain corrosive vapors may readily be protected in accordance with my process. Thus, in the modifications described above, it is clear that not only the gasket but the entire flanged closure structure is protected by the non-corrosive gas, thus enabling the closure to be fabricated of cheaper non-corrosive materials. It will be evident that any portion of an apparatus could be protected in a similar manner by providing means for maintaining the non-corrosive gas in contact with the part to be protected. Thus, by providing suitable baffles even the side walls of a vaporizer could suitably be isolated from corrosive vapors if desired. In such a case heavy pressure resistant walls of cheap constructional material could be utilized for an apparatus designed for high pressure operation, only a relatively thin baffle wall of corrosion resistant material being required to insure protection of the main walls of the vessel. Numerous similar applications of the principle of my invention will, of course, appear to those skilled in the art.

It will also be evident, of course, that various modifications of structure or procedure may be employed without departing from the scope of my invention. Various gases other than those previously mentioned may, of course, be employed for the protection of corrodible parts of the apparatus, the only requirement being that the gas be non-corrosive, and chemically inert in the presence of nitric acid under the conditions employed or reactive with nitric acid to form a desired product. Thus, in the case of vapor phase nitration of hydrocarbons, such as ethane, propane, butane, and the like, the hydrocarbon to be nitrated may be introduced into the nitric acid vaporizer to protect the gaskets, and any reaction occurring between the hydrocarbon and nitric acid will merely form the desired product of the subsequent reaction. It will be seen that in such modifications of the process, the protecting gas may be introduced at a relatively rapid rate and the entire mixing of the reactants may be effected in the vaporizer. Under such conditions the rapid flow of the protecting gas in the vicinity of the portion of the apparatus to be protected will insure effective isolation from corrosive vapors with less efficient physical separation by baffles or otherwise. In addition to such procedural modifications it will be apparent that the apparatus may also be modified in numerous respects as, for example, by providing a plurality of baffles, or a packing of porous or finely divided non-corrodible material in the protective chamber, or by providing protective chambers of various forms designed to minimize diffusion or mixing of the corrosive vapors and the protecting gas. It is to be understood that any such modifications of structure or procedure, and the use of any equivalents which would naturally occur to one skilled in the art, are included within the scope of my invention.

My invention now having been described, what I claim is:

1. In a vessel having a main chamber adapted to contain a corrosive gas and having a removable closure fitted thereto including a gasket corrodible by said gas, a secondary chamber surrounding the exposed surface of said gasket and communicating with said main chamber, through which said gas must penetrate in order to contact said gasket, means for introducing a corrosive gas into said main chamber, means for introducing a non-corrosive gas into said secondary chamber, means forming a part of said secondary chamber for inhibiting diffusion of gas from said main chamber into said secondary chamber, and an exit port for said main chamber.

2. In a vessel adapted to vaporize nitric acid and having a removable closure fitted thereto including a gasket corrodible by nitric acid vapors, a secondary chamber surrounding the exposed surface of said gasket and communicating with said main chamber, through which said vapors must penetrate in order to contact said gasket, means for introducing nitric acid into said main chamber, means for supplying heat to vaporize said nitric acid in said main chamber, means for introducing a non-corrosive gas into said secondary chamber, baffling means positioned between said main chamber and said secondary chamber for inhibiting diffusion of nitric acid vapors from said main chamber into said secondary chamber, and an exit port for said main chamber.

KENNETH H. HOOVER.